Feb. 27, 1962   W. L. FLOEHR   3,022,536
TORSION SPRING ASSEMBLY
Filed June 9, 1959   2 Sheets-Sheet 1

Inventor:
Walter L. Floehr
By Wilmer Mechlin
his Attorney

Feb. 27, 1962  W. L. FLOEHR  3,022,536

TORSION SPRING ASSEMBLY

Filed June 9, 1959  2 Sheets-Sheet 2

Inventor:
Walter L. Floehr
By Wilmer Mechlin
his Attorney

United States Patent Office 3,022,536
Patented Feb. 27, 1962

3,022,536
TORSION SPRING ASSEMBLY
Walter L. Floehr, Toledo, Ohio, assignor to Unitcast Corporation, Toledo, Ohio, a corporation of Ohio
Filed June 9, 1959, Ser. No. 819,164
9 Claims. (Cl. 16—75)

This invention relates generally to torsion springs and has for its primary object the provision of an improved torsion spring arrangement for a hinged member whereby the force exertible on the member by the spring may be adjusted by varying the spring's effective length.

Another object of the invention is to provide an improved torsion spring arrangement for assisting in swinging a hinged member whereby by varying the effective length of the spring, the force exertible by it may be adjusted to the imposable load whether the latter is imposed on swinging of the member in one or both directions relative to the support on which it is hinged.

An additional object of the invention is to provide an improved torsion spring assembly of adjustable force which is rugged in construction and simple and effective in operation.

Other objects and advantages of the invention will appear hereafter in the detailed description, be particularly pointed out in the appended claims and be illustrated in the accompanying drawings, in which:

Figure 1:
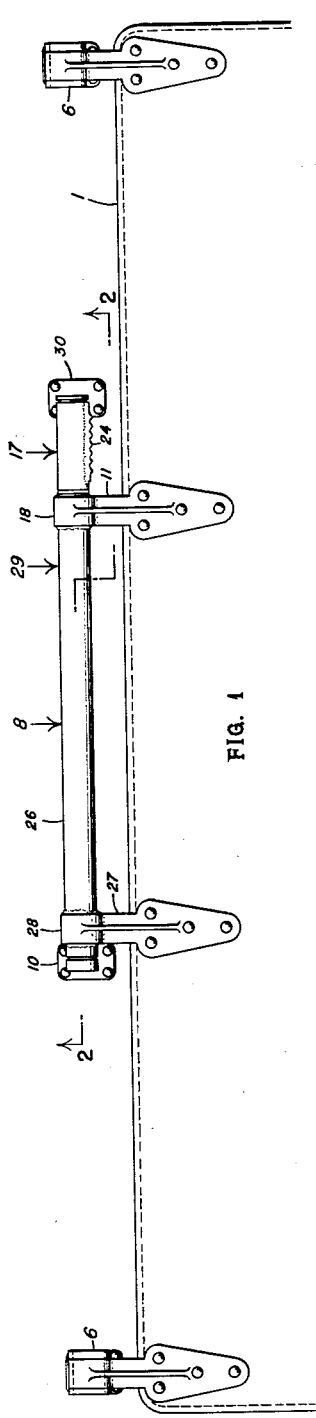
FIGURE 1 is a plan view of a preferred embodiment of the torsion spring assembly of the present invention.
Figure 2:
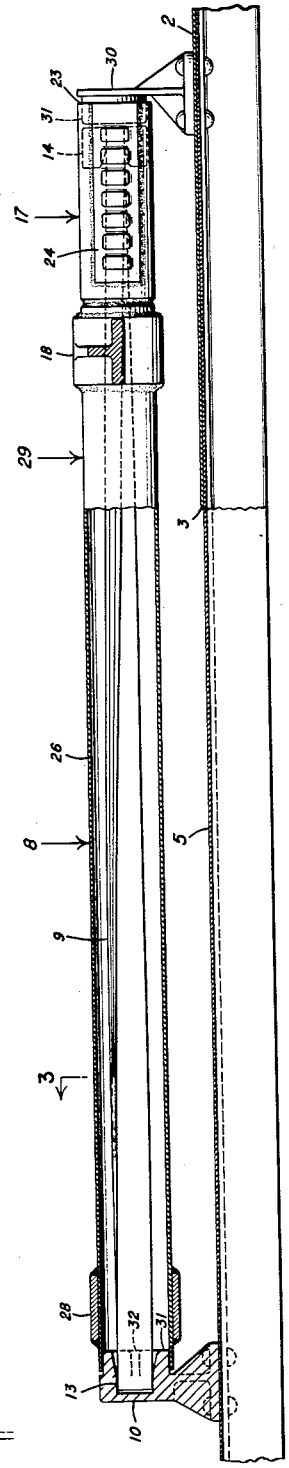
FIGURE 2 is a vertical sectional view on an enlarged scale taken along the lines 2—2 of FIGURE 1.
Figure 3:
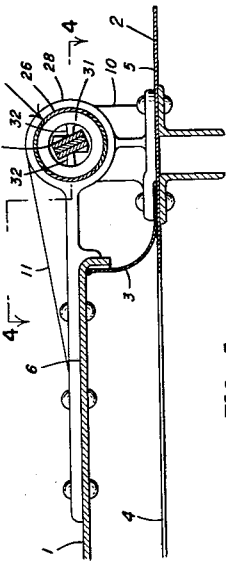
FIGURE 3 is a fragmentary vertical sectional view taken along the lines 3—3 of FIGURE 2.
Figure 4:
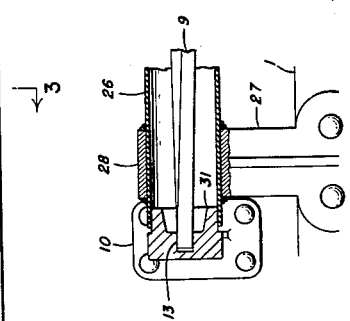
FIGURE 4 is a fragmentary horizontal sectional view taken along the lines 4—4 of FIGURE 3.
Figure 5:
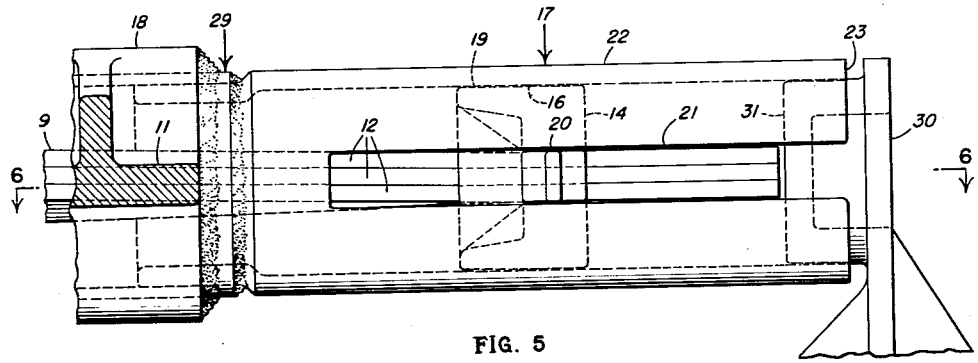
FIGURE 5 is a fragmentary side elevational view partly in section and on an enlarged scale of the end portion of the assembly of FIGURE 1 housing the shiftable anchor.
Figure 6:
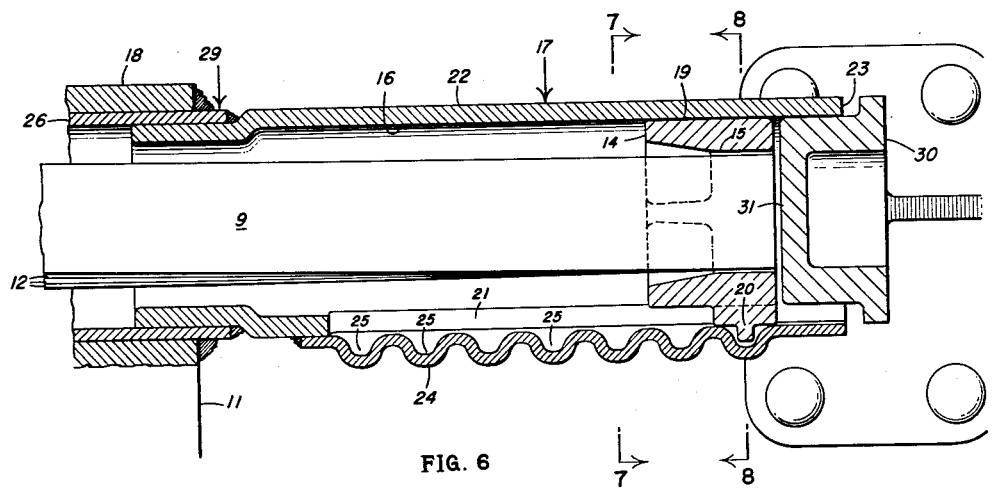
FIGURE 6 is a horizontal sectional view taken along the lines 6—6 of FIGURE 5.
Figure 7:
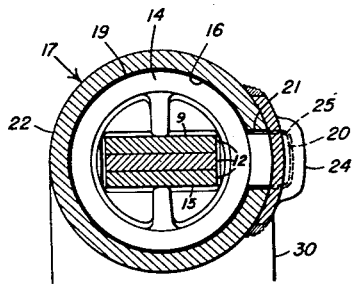
FIGURE 7 is a vertical sectional view taken along the lines 7—7 of FIGURE 6.
Figure 8:
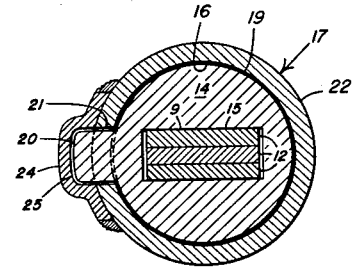
FIGURE 8 is a vertical sectional view taken along the lines 8—8 of FIGURE 6.
Figure 9:
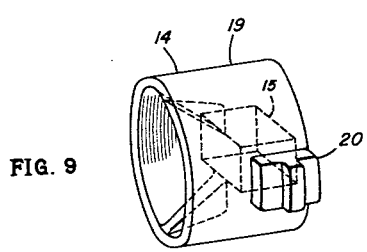
FIGURE 9 is a perspective view of the shiftable anchor of the assembly.

Referring now in detail to the drawings in which like reference characters designate like parts, the improved torsion spring assembly of the present invention is applicable to any installation in which movement of one of a pair of relatively movable members may be assisted or resisted by a torsion spring and it is desired or required to adjust the force exertible by the spring. Unlike the more usual adjustable torsion spring assembly which depends for adjustment on imparting a twist to its spring and thus is effective to assist or resist movement of a member in but one direction, the assembly of this invention is capable of adjustment for determining the force exerted by its torsion spring in opposing or assisting movement of one member relative to another in either or both directions. As applied to a vertically swingable hinged closure member, it thus is equally effective whether the member in opening swings downwardly toward or past a horizontal position in the manner of drop end or bottom doors of a railway hopper car or upwardly to and then downwardly from a vertical position in the manner of hatch covers of covered hopper cars.

The physical principle on which this invention is based is that the force exertible by a torsion spring will vary inversely with its effective length and thus can be adjusted by varying the longitudinal spacing between the means by which it is anchored to each of a pair of relatively movable members. Embodying this principle in novel form, the torsion spring assembly of this invention has been applied for purposes of illustration to a hinged hatch cover or closure member 1 of a covered hopper car 2, both of which are shown only in part.

The illustrated hatch cover 1 is designed to rest in closed position substantially horizontally on the coaming 3 about the hatch or opening 4 in the roof 5 of the hopper car 2 and to swing vertically through an intermediate vertical position to open position at which it rests, again substantially horizontally on the roof at a side of the hatch. Swinging vertically about a substantially horizontal axis from either closed or open position, first upwardly and then downwardly, to reach the other position, the cover 1 is hinged or pivotally or swingably connected to a suitably reinforced section of its support, the roof 5, at one side of the hatch 4, in part by a pair of side or corner hinges 6 connected to the hatch adjacent the opposite extremities of its hinged or proximal end 1. Extending almost the width of the roof 5, the illustrated cover 1 is much larger than the ordinary hatch cover and, because of its correspondingly greater weight, is practically impossible to lift, unassisted, from either closed or open position but can readily be swung between these positions with the aid of the illustrated torsion spring assembly.

Designated as 8, the torsion spring assembly is comprised of a torsion rod bar or other substantially straight, longitudinally elongated torsion spring 9 which is energizable by being twisted about its longitudinal axis. Extending substantially parallel to and preferably along and coaxial with the hinging axis of the cover 1, the torsion spring 9 is anchored at or toward one end to the roof or support 5 by a roof, car body or support bracket 10 and at or toward its opposite end to the cover 1 by a cover closure bracket 11, the brackets 10 and 11, respectively, being fixed to or rigid with the roof and the cover. Rectangular or otherwise out-of-round in section toward its ends to facilitate its anchoring, the torsion spring 9 may be formed, as in the illustrated embodiment, of a plurality of spring plates 12 arranged side by side and conveniently may have one end connected or anchored directly to one of the brackets, here the support bracket 10, as by seating that end in a correspondingly out-of-round socket 13 in that bracket. However, the opposite or remote end portion of the spring 9, instead of being connected directly to the other bracket, here the closure bracket 11, is anchored thereto by a spool, thimble or anchor member 14 having a correspondingly out-of-round aperture or opening 15 through which the spring extends and which is shiftable axially or longitudinally but is held or locked against rotation relative to the associated bracket.

The required axial mobility and rotative immobility of the spool 14 relative to the closure bracket 11 is obtained by containing or receiving and slidably mounting the spool in an axial or central bore 16, concentric with the hinging axis of the cover 1, of a casing or housing 17 welded or otherwise normally attached or fixed to or made rigid with the closure bracket 11. With the illustrated closure bracket 11 in the form of a half hinge through the hinge loop 18 of which the torsion spring 9 extends, the casing 17 conveniently may be in the form of a tubular extension or projection concentric with and fixed to a side of the hinge loop and extending or projecting therefrom away from the support bracket 10.

While the spool 14 could be non-rotatably connected or locked against rotation relative to the casing 17 and thus to the closure bracket 11 simply by keying the spool to the bore 14 or making the spool out-of-round peripherally and giving the bore 16 a corresponding cross-section, this would not suffice for the simple adjustment of the force exertible by the torsion spring 9 for which the spring assembly 8 is designed. Keying is used as the means of preventing rotation of the spool 14 relative to the casing 17 but it is not internal of the casing. Instead, the spool 14 has formed on or fixed to its periphery 19 a lug or stud 20 projecting or outstanding radially therefrom through a slot or keyway 21 interrupting or opening through the side wall 22 of the casing 17 and extending inwardly from the latter's outer end 23, parallel to the hinging axis of the cover 1, a distance sufficient to accommodate the lug over the desired range of axial movement of the spool in the bore 16. With this construction, it is possible by tapping the projecting portion of the lug 20 in one direction or the other longitudinally of the casing 17, to determine the effective length of the torsion spring 9 and thus adjust the force exertible by it. To maintain this adjustment once it has been made, the slot 21 is then covered by a locator or cover plate 24 removably attached or preferably fixed, as by welding, externally to the side wall 22 of the casing 17 and having a plurality of longitudinally spaced indentations or pockets 25 for selectively receiving or seating the outstanding portion of the lug 20 and fixing the spool 14 in any of a like number of axially spaced adjusted positions in the bore 16.

It is desirable that the torsion spring 9, as a whole, be protected from the elements, this readily being accomplishable by use of a tube or pipe 26 loosely surrounding the spring and extending from the support bracket 10 to the closure bracket 11. It also is both desirable and possible to use the spring assembly 8 for hingedly connecting the closure member 4 to its support 5, either alone or if, as in the illustrated embodiment, the length of the spring 9 required to counterbalance the weight of the closure member is much less than the latter's width, in conjunction with other hinges, such as the side hinges 6. To put the spring assembly to such use, the tube 26 and the casing 17 forming its axial extension are attached or secured to the cover 1 by a pair of laterally or transversely spaced brackets, one the closure bracket 11 and the other a companion closure bracket 27, each conveniently in the same half hinge form, with the tube 26 extending through and fixed, as by welding, to the hinge loop 18 of the closure bracket 11 and to the casing 17 and extending through and welded or otherwise fixed to the hinge loop 28 of the companion closure bracket 27. Thus projecting beyond opposite sides of the pair of closure brackets 11 and 27, the tube 26 and casing 17 together form an open-ended tubular member 29 which readily is rotatably connected to the roof 5 by pairing the support bracket 10 with a companion support bracket 30 fixed or secured in like fashion to the roof 5, the support brackets being longitudinally spaced in correspondence with the length of the tubular member 29 and having inwardly extending or confronting concentric cylindrical bosses or pintles 31, each fitting into or seating in and rotatably mounting or journalling the contiguous or confronting end of the tubular member, the boss on the first or spring anchoring support bracket 10 here seating in the tubes 26 and being formed about the spring receiving socket 13 therein.

With insertion of the ends of its spring plate 12 into the socket 13 in the spring anchoring support bracket 10 and the aperture 15 in the spool 14 preferably facilitated by guide ribs 32 formed in these members at the entrances to their openings and the spool shiftable longitudinally or axially along the spring relative to the several brackets, the force exertible by the spring may be adjusted whether the spring is to oppose or assist movement of the closure member in one or both directions relative to the support. Thus, if, as in a drop end or bottom door of a hopper car, the closure member in opening swings downwardly, variation in the effective length of the spring 9 by shifting the spool 14, alone, may be used to adjust the force exertible by the spring to the weight of the particular closure member to which it is applied, or, since in such an installation the spring need be energized only on swinging of the closure member in one direction, an initial rough or approximate adjustment can be made by partially rotating the casing 17 and therethrough the spool 14 before the casing is fixed to the adjoining closure bracket 11. Shifting of the spool relative to the casing then can be used to give a final adjustment to the spring. If, on the other hand, the spring must assist in both opening and closing the closure member 1, as in the case of the illustrated hatch cover, which must be lifted initially in being swung from one to the other of its open and closed positions, no preliminary twisting is possible without destroying the balance between the forces required for opening and closing, and shifting of the spool must be depended entirely upon for adjusting the force exertible by the spring to the weight of the particular closure member to which it is applied. The adjustments made in the case of a vertically swinging closure member primarily to adjust to the weight of the member may also be made in case the spring assembly is applied to a horizontally swinging closure member to oppose its opening, shifting of the spool 14 then serving as either the final or the only possible adjustment depending on whether the closure member swings in one or both directions from closed position.

From the above detailed description, it will be apparent that there has been provided an improved torsion spring assembly which may be used in hingedly connecting a closure member to a support and, in any case, enables the force exertible by its spring to be adjusted to the particular load imposable on it, regardless of the direction in which the closure member is swung to impose that load. It should be understood that the described and disclosed embodiment is merely exemplary of the invention, and that all modifications are intended to be included which do not depart from either the spirit of the invention or the scope of the appended claims.

Having described my invention, I claim:

1. A torsion spring assembly for a pair of relatively swingable members, comprising bracket means each rigid with one of said members, torsion spring means anchored to one of said bracket means, means attached to one of said bracket means and receiving a portion of said spring means, anchor means connected for relative longitudinal shifting and against relative rotation to said attached means and spring portion and effective on said relative longitudinal shifting thereof for adjusting the force exertible by said spring means on relative swinging of said members, and means effective on completion of the adjustment for locking said anchor means against shifting relative to said attached means and fixing the adjustment of said spring means.

2. A torsion spring assembly for a pair of relatively swingable members, comprising bracket means each rigid with one of said members, torsion spring means anchored to one of said bracket means, means attached to one of said bracket means and receiving a portion of said spring means, anchor means connected for relative longitudinal shifting and against relative rotation to said attached means and spring portion and effective on said relative longitudinal shifting thereof for adjusting the force exertible by said spring means on relative swinging of said members, and means effective on completion of the adjustment for selectively locking said anchor means against shifting relative to said attached means in any of a plurality of longitudinally spaced positions on and fixing the adjustment of said spring means.

3. A torsion spring assembly for a pair of relatively swingable members, comprising bracket means each rigid with one of said members, torsion spring means anchored to one of said bracket means, a casing attached to one of said bracket means and receiving a portion of said spring means, anchor means nonrotatably received in said casing and non-rotatably receiving said spring portion and shiftable longitudinally in said casing on said spring portion for adjusting the force exertible by said spring means on relative swinging of said members, and means effective on completion of the adjustment for locking said anchor means against shifting relative to said casing and fixing the adjustment of said spring means.

4. A torsion spring assembly for a closure member swingable on a support member, comprising a bracket rigid with each of said members, torsion spring means having an end anchored to one of said brackets, a casing secured to the other bracket and having a bore extending longitudinally of and receiving a portion of said spring means remote from said end, a spool slidable longitudinally in said bore on and non-rotatably receiving said spring portion, lug means fixed to and outstanding radially from said spool through a longitudinally elongated slot in a side of said casing for locking said spool and casing against relative rotation, and means securable to said casing and engageable with said lug means for locking said spool against shifting relative to said casing.

5. A torsion spring assembly for a closure member swingable on a support member, comprising a bracket rigid with each of said members, torsion spring means having an end anchored to one of said brackets, a casing secured to the other bracket and having a bore extending longitudinally of and receiving a portion of said spring means remote from said end, a spool slidable longitudinally in said bore on and non-rotatably receiving said spring portion, lug means fixed to and outstanding radially from said spool through a longitudinally elongated slot in a side of said casing for locking said spool and casing against relative rotation, and means securable to said casing and engageable with said lug means for selectively locking said spool against shifting relative to said casing in any of a plurality of longitudinally spaced positions.

6. A torsion spring assembly for a closure member swingable on a support member, comprising a bracket rigid with each of said members, torsion spring means having an end anchored to one of said brackets, a casing secured to the other bracket and having a bore extending longitudinally of and receiving a portion of said spring means remote from said end, a spool slidable longitudinally in said bore on and non-rotatably receiving said spring portion, lug means fixed to and outstanding radially from said spool through a longitudinally elongated slot in a side of said casing for locking said spool and casing against relative rotation, and a cover plate securable to said casing over said slot and having a plurality of apertures spaced longitudinally thereof for selectively receiving said lug means and locking said spool against shifting relative to said casing in any of a plurality of spaced positions.

7. A torsion spring assembly for a closure member swingable on a support member, comprising spaced brackets on one of said members, tubular means fixed to and projecting axially beyond said brackets, brackets on the other member embracing and journalling opposite ends of said tubular means for hingedly connecting said members, torsion spring means in and extending axially of said tubular means and having an end anchored in one of said embracing brackets, anchor means in and shiftable axially of said tubular means and slidably and non-rotatably receiving a portion of said spring means remote from said end, means for locking said anchor means against rotation relative to said tubular means during axial shifting thereof for enabling said axial shifting to adjust the force exertible by said spring means on relative hinging of said members, and means effective on completion of the adjustment for locking said anchor means in force-adjusted position.

8. A torsion spring assembly for a closure member swingable on a support member, comprising spaced brackets on one of said members, a tube fixed to and connecting said brackets and projecting at one end axially therebeyond, a cylindrical casing concentric with and secured to the opposite end of said tube, brackets on said other member embracing and journalling contiguous ends of said tube and casing, torsion spring means in and extending axially of said tube and having one end anchored to one of said embracing brackets and an opposite end extending into said casing, anchor means in and shiftable axially of said casing and slidably and non-rotatably receiving a portion of said spring means extending thereinto, lug means fixed to and projecting radially from said anchor means through an axially elongated slot in said casing for locking said anchor means and casing against relative rotation, said anchor means being shiftable axially of said casing through said lug means for adjusting the force exertible by said spring means on relative hinging of said members, and a cover plate securable to said casing over said slot and having a plurality of apertures spaced longitudinally thereof for selectively receiving said lug means and locking said anchor means against shifting relative to said casing in any of a plurality of force-adjusting positions.

9. In a torsion spring assembly for a closure member swingable on a support member and having torsion spring means extending along the swinging axis of said closure member and anchored at one end to a bracket rigid with one of said members, the combination of a tubular casing fixable to the other of said members and having a bore concentric with said axis and receiving a portion of said spring means remote from the anchored end thereof, a spool shiftable axially in said bore and having an aperture slidably and non-rotatably receiving said spring portion, a lug on and outstanding radially from said spool through a longitudinally elongated slot in a side of said casing for locking said spool and casing against relative rotation, and a cover plate securable to said casing over said slot and having a plurality of longitudinally spaced apertures for selectively receiving said lug and locking said spool in any of a plurality of positions against axial shifting relative to said casing.

References Cited in the file of this patent
UNITED STATES PATENTS

| | | |
|---|---|---|
| 2,580,760 | Goodwin | Jan. 1, 1952 |
| 2,675,985 | Boiteux | Apr. 20, 1954 |
| 2,878,531 | Benham | Mar. 24, 1959 |